United States Patent [19]

Iannicelli et al.

[11] Patent Number: 4,552,734

[45] Date of Patent: Nov. 12, 1985

[54] FLUIDIZATION PROCESS FOR REMOVING TOTAL REDUCED SULFUR COMPOUNDS FROM INDUSTRIAL GASES

[75] Inventors: Joseph Iannicelli, Jekyll Island, Ga.; Leif Caspersen, Horsholm, Denmark; Jan Hansen, Lyngby, Denmark; Sven Pedersen, Gentofte, Denmark

[73] Assignee: Aquafine Corporation, Brunswick, Ga.

[21] Appl. No.: 530,267

[22] Filed: Sep. 8, 1983

[51] Int. Cl.$^4$ .................. C01B 17/16; C01B 31/20
[52] U.S. Cl. .................. 423/230; 423/244; 423/245
[58] Field of Search .......... 423/242 A, 242 R, 244 A, 423/244 R, 230, 245 S, 245 R, 50

[56] References Cited

U.S. PATENT DOCUMENTS

| | | | |
|---|---|---|---|
| 2,926,999 | 3/1960 | Tarbutton et al. | 423/242 |
| 2,984,545 | 5/1961 | Tarbutton et al. | 423/242 |
| 3,150,923 | 9/1964 | Bienstock et al. | 423/242 |
| 3,226,192 | 12/1965 | Atsukawa et al. | 423/242 |
| 3,323,289 | 6/1967 | Venemark | 55/73 |
| 3,330,096 | 7/1967 | Zimmerley | 55/73 |
| 3,492,083 | 1/1970 | Lowicki et al. | 423/244 A |
| 3,574,562 | 4/1971 | Kawahata | 23/284 |
| 3,761,570 | 9/1973 | Lowicki et al. | 423/242 |
| 3,798,310 | 3/1974 | Atsukawa et al. | 423/244 A |
| 3,898,320 | 8/1975 | Atsukawa et al. | 423/242 A |
| 3,932,587 | 1/1976 | Grantham et al. | 423/242 |
| 3,969,479 | 7/1976 | Lonne et al. | 423/210 |
| 4,076,793 | 2/1978 | Nikolai | 423/242 |
| 4,125,589 | 11/1978 | DeVries | 423/245 |
| 4,164,545 | 8/1979 | Scott | 423/239 |
| 4,197,278 | 4/1980 | Gehri et al. | 423/244 |
| 4,489,047 | 12/1984 | de Jong et al. | 423/230 |

FOREIGN PATENT DOCUMENTS

| | | | |
|---|---|---|---|
| 1466019 | 1/1966 | France . | |
| 719056 | 11/1954 | United Kingdom | 423/230 |
| 1576534 | 10/1980 | United Kingdom . | |

OTHER PUBLICATIONS

Sewell, "Assessment of Some Solid Filters for Removing Hydrogen Sulphide and Sulphur Dioxide from Air", Report No. C.D. 2168, Chemistry Division, Department of Scientific and Industrial Research, New Zealand, Nov. 1973.

Hudson et al, "Hydrogen Sulfide Adsorption by Manganese Dioxide and Activated Carbon, Environmental Science and Technology, Vol. 8, No. 3, Mar. 1974, pp. 238–243.

Turkdogan et al, "Desulfurization of Hot Reducing Gases with Manganese Oxide Pellets", Proceedings International Iron and Steel Congress, 3rd, American Society of Mettallurgists, Ohio (1979).

Gmelin: Handbuch der anorganischen Chemie, i. Auflage (1973), Mangan IV oxid, p. 306.

Chem. Abstracts 1958, No. 9481d.

Chem. Abstracts 1960, No. 9225c.

Chem. Abstracts 1969, No. 49512c.

Lal, "On the Action of Hydrogen Sulphide on Manganese Dioxide", *Jour. Indian Chem. Soc.*, vol. 29, No. 12, 1952, pp. 934–936.

Uno et al, "Scale-up of a $SO_2$ Control Process", *Chemical Engineering Progress*, vol. 66, No. 1, Jan. 1970, pp. 61–65.

Copeland et al, "Preparation of a Dry Cell Depolarizer by Air Oxidation of Manganous Hydroxide," Oct. 17, 1947.

Kirk-Othmer: Encyclopedia of Chemical Technology, 3rd Edition, vol. 14, p. 856.

*Primary Examiner*—Gregory A. Heller
*Attorney, Agent, or Firm*—Banner, Birch, McKie & Beckett

[57] ABSTRACT

A process is disclosed for removing total reduced sulfur compounds (TRS), especially $H_2S$ and mercaptans, from industrial gases wherein substantially dry activated manganese dioxide absorbent particles are fluidized with the industrial gas at an elevated temperature sufficient to effect oxidation of the total reduced sulfur compounds and the absorption of the oxidized compounds on the absorbent particles. In preferred practice, the dried powder containing areas of the oxidized sulfur compounds is recovered as a particle layer in a bag filter unit through which the industrial gas is caused to flow.

23 Claims, 4 Drawing Figures

FLUIDIZATION PROCESS FOR REMOVING TOTAL REDUCED SULFUR COMPOUNDS FROM INDUSTRIAL GASES

BACKGROUND OF THE INVENTION

1. Field of the Invention

The present invention relates to a process for the removal of Total Reduced Sulfur compounds (TRS), especially $H_2S$ and mercaptans, from industrial gases. More particularly, the present invention relates to a moving or fluid bed absorption process employing particulate manganese dioxide as an oxidative absorbent and preferably involves enhanced absorption by including a bag filter unit downstream of the absorber.

2. Description of the Prior Art

Various processes have been proposed for reducing the content of sulfur compounds in industrial waste gases. Most of these processes relate to the removal of sulfur oxides. Because of their substantial acidic character, these sulfur oxides are readily absorbed by alkaline absorbents. Unfortunately, the same absorbents are not generally satisfactory for removing a number of important industrial byproduct sulfur compounds such as hydrogen sulfide, mercaptans and other organic sulfur containing compounds, since the acidic character of these compounds is generally much less pronounced. This is particularly true of the mercaptans for which there is no effective removal process being used commercially.

In British Patent Specification No. 1,576,534 a process for removing hydrogen sulfide from a hot reducing gas is disclosed. The process uses an absorbent comprising a mixture of finely divided manganese oxide, i.e., manganese of oxidation state 2, and finely divided aluminum oxide. Both the absorption and regeneration steps of the patented process require gas temperatures substantially higher than those typically encountered in industrial applications, for example, in pulping mills. Furthermore, a hot sulfur oxide-containing gas is produced by the disclosed high temperature regeneration technique, creating additional disposal problems in many cases. Moreover, it does not appear that the absorbent can remove mercaptans from gas streams.

U.S. Pat. No. 3,898,320 to Atsukawa uses a dry, powdered absorbent comprising a hydrated manganese oxide to remove sulfur oxides from gas streams. As described, the sulfur oxides in the gas react with the hydrated manganese oxide absorbent to produce manganese sulfate. The manganese sulfate is subsequently solubilized in water, converted to manganese hydroxide in the presence of ammonium hydroxide and is thereafter reconverted to the hydrated absorbent by oxidation with an oxygen-containing gas. The oxidation is conducted by bubbling the oxygen-containing gas through an aqueous dispersion of the manganese hydroxide. As in the prior process, there is not indication that this absorbent can be used to remove $H_2S$ or reduced organic sulfur compounds, particularly mercaptans.

U.S. Pat. No. 3,492,083 to Lowicki, et al., describes a process for removing sulfur containing compounds including $H_2S$ and organic sulfur compounds which employs a complex multicomponent absorbent. This absorbent includes a metal oxides, hydrated oxide or hydroxide or preferably mixtures thereof, for example, manganese dioxide and magnesium oxide, in combination with an alkali metal or alkaline earth metal oxide or hydroxide, for example, sodium hydroxide. The absorption process is conducted at a relatively low temperature but an oxidic roasting at an elevated temperature above at least about 750° C. is required to regenerate the absorbent. As in the prior British patent, problems with disposing a high temperature regeneration gas containing sulfur dioxide are created in many cases.

It is an object of the present invention to provide a process and apparatus for efficiently removing $H_2S$ and organic sulfur-containing compounds, and particularly mercaptans, from industrial gas streams.

It is another object of this invention to provide a process and apparatus for removing the aforementioned sulfur compounds from industrial gas streams that permits a smooth and continuous operation suitable for automation.

It is a further object of this invention to provide a process for removing these sulfur compounds from industrial gas streams which employs a readily available absorbent that can be simply and efficiently regenerated by ambient temperature oxidation procedures.

SUMMARY OF THE INVENTION

These and other objectives which will readily occur to those skilled in the art are achieved by the present invention which comprises a process for removal of Total Reduced Sulfur compounds from an industrial gas comprising the steps of:

(a) fluidizing substantially dry, activated manganese dioxide absorbent particles in a reaction zone with an elevated temperature stream of said industrial gas to effect oxidation of said Total Reduced Sulfur compounds and absorption of Total Reduced Sulfur compound oxidation products on said absorbent particles;

(b) recovering manganese dioxide absorbent particles containing areas of reduced manganous compounds from said reaction zone;

(c) suspending at least a part of the absorbant particles recovered in step (b) in water to produce an aqueous regeneration suspension;

(d) subjecting at least the aqueous portion of said regeneration suspension to liquid phase oxidation to produce an activated manganese dioxide absorbent-containing suspension;

(e) drying the activated manganese dioxide absorbent-containing suspension to produce substantially dry, activated manganese dioxide absorbent particles; and (f) recycling the activated manganese dioxide absorbent to the reaction zone.

The present invention also provides a process for the removal of Total Reduced Sulfur compounds from an industrial gas comprising the steps of:

(a) fluidizing substantially dry, activated manganese dioxide absorbent particles in a reaction zone with an elevated temperature stream of said industrial gas to effect oxidation of said Total Reduced Sulfur compounds and absorption of Total Reduced Sulfur compound oxidation products on said absorbent particles;

(b) recovering from said reaction zone a gas stream containing entrained manganese dioxide absorbent particles, said particles containing areas of reduced manganous compounds;

(c) forwarding said gas stream to a bag filter collector and therein separating said entrained absorbent particles from said gas stream, said particles forming a layer on the filter surface whereby further removal of Total Reduced Sulfur compounds from the gas stream is effected;

(d) recovering said layer of asorbent particles from said bag filter collector;

(e) suspending at least a part of the absorbant particles recovered in step (d) in water to produce an aqueous regeneration suspension;

(f) subjecting at least the aqueous portion of said regeneration suspension to liquid phase oxidation to produce an activated manganese dioxide absorbent-containing suspension;

(g) drying the activated manganese dioxide absorbent-containing suspension to produce substantially dry, activated manganese dioxide absorbent particles; and (h) recycling the activated manganese dioxide absorbent to the reaction zone.

In a preferred embodiment of this invention, the manganese dioxide absorbent, containing areas of reduced manganeous compounds is regenerated (i.e., activated) by:

(a) providing an aqueous regeneration medium by supplying a flow of oxygen-containing gas through said aqueous medium;

(b) adding to said aqueous regeneration medium at least a part of the manganese dioxide absorbent containing areas of reduced manganese compounds or an aqueous extract thereof;

(c) after the oxygen-containing gas flow to step (a) has begun, maintaining, by alkaline material addition if necessary, the pH in said regenerating medium at an alkaline level sufficient to produce an activated manganese absorbent-containing suspension;

(d) continuing the flow of said oxygen-containing gas through the alkaline regenerating medium for a period sufficient to produce an activated manganese dioxide absorbent-containing suspension; and (e) drying the activated manganese dioxide absorbent-containing suspension to produce substantially dry, activated manganese dioxide absorbent particles.

BRIEF DESCRIPTION OF THE DRAWINGS

The exact nature of the present invention, as well as the objects and advantages thereof, will be more readily apparent from the following specification in connection with the attached drawings in which.

DESCRIPTION OF THE INVENTION

As used in the specification and claims, the term "industrial gas" refers to gases produced as products or byproducts in industrial processing facilities including, for example, waste gases from pulping mills, petroleum refineries, and other chemical manufacturing and refining installations.

The terms "Total Reduced Sulfur compound" herein refers in general to sulfur compounds having no substantial acidic character and includes, inter alia, $H_2S$, mercaptans such as methyl mercaptan, butyl mercaptan and the like, organic sulfides such as dimethyl sulfide, dimethyl disulfide, dimethyl sulfoxide and similar materials including homologs of the foregoing. These Total Reduced Sulfur (TRS) compounds are typically toxic and/or ordorous contaminants of various industrial gases which must be at least partially removed before releasing the gases into the environment or before the gases can be used for other purposes.

The terms "manganese dioxide" or "$MnO_2$" as used in the specification and claims refer to both naturally occurring forms, i.e., ores and synthetic forms of this compound. In addition, "$MnO_2$" materials employed as virgin starting material or as regenerated materials can have an oxygen content below exact stoichiometric amounts, i.e., slightly less than 2. Moreover, it is to be understood that the formula and term also cover compounds which may be hydrated. For convenience, all these $MnO_x$ materials are simply referred to as $MnO_2$ or manganese dioxide.

As used herein the terms "moving bed", "fluid bed", "fluidization", "fluidizing" and the like pertain generally to those arrangements and conditions used in the art for contacting substantially dry solid particles with gas wherein the contact causes the particles to exhibit quasi-fluid behavior.

The basic starting material employed in the process of the present invention is the $MnO_2$ absorbent. In order to be useful in the absorption process it is necessary that the $MnO_2$ employed be activated. Some sources of $MnO_2$ by either their nature or their method of production possess this activity without special treatment. In many cases, however, it is necessary to perform an activation step prior to use of the $MnO_2$ as an absorbent for TRS compounds. According to the present invention, this activation is preferably accomplished by subjecting the non- or partially-active $MnO_2$ to at least one reduction/oxidation cycle. While this redox cycle treatment can, of course, be effected as a separate absorbent preparation step, it is preferred to utilize hereinafter-described regeneration steps of the present invention to effect or enhance the activation of the absorbent. Using this approach, the recycled regenerated material is in effect activated by reduction in the moving or fluid bed reaction zone and oxidation in the regeneration step. It has also been found that the activity of some $MnO_2$ starting material or unregenerated recycle $MnO_2$ (as described hereinafter) may be increased by merely washing the absorbent with water. This may have the effect of removing interfering water-soluble salts on the surface of the insoluble $MnO_2$ materials. While initial activities of various $MnO_2$ materials may vary widely, the wet oxidative regeneration step of the present invention results in high activity for most $MnO_2$ materials. This discovery forms an important aspect of the present invention.

Figure 1:
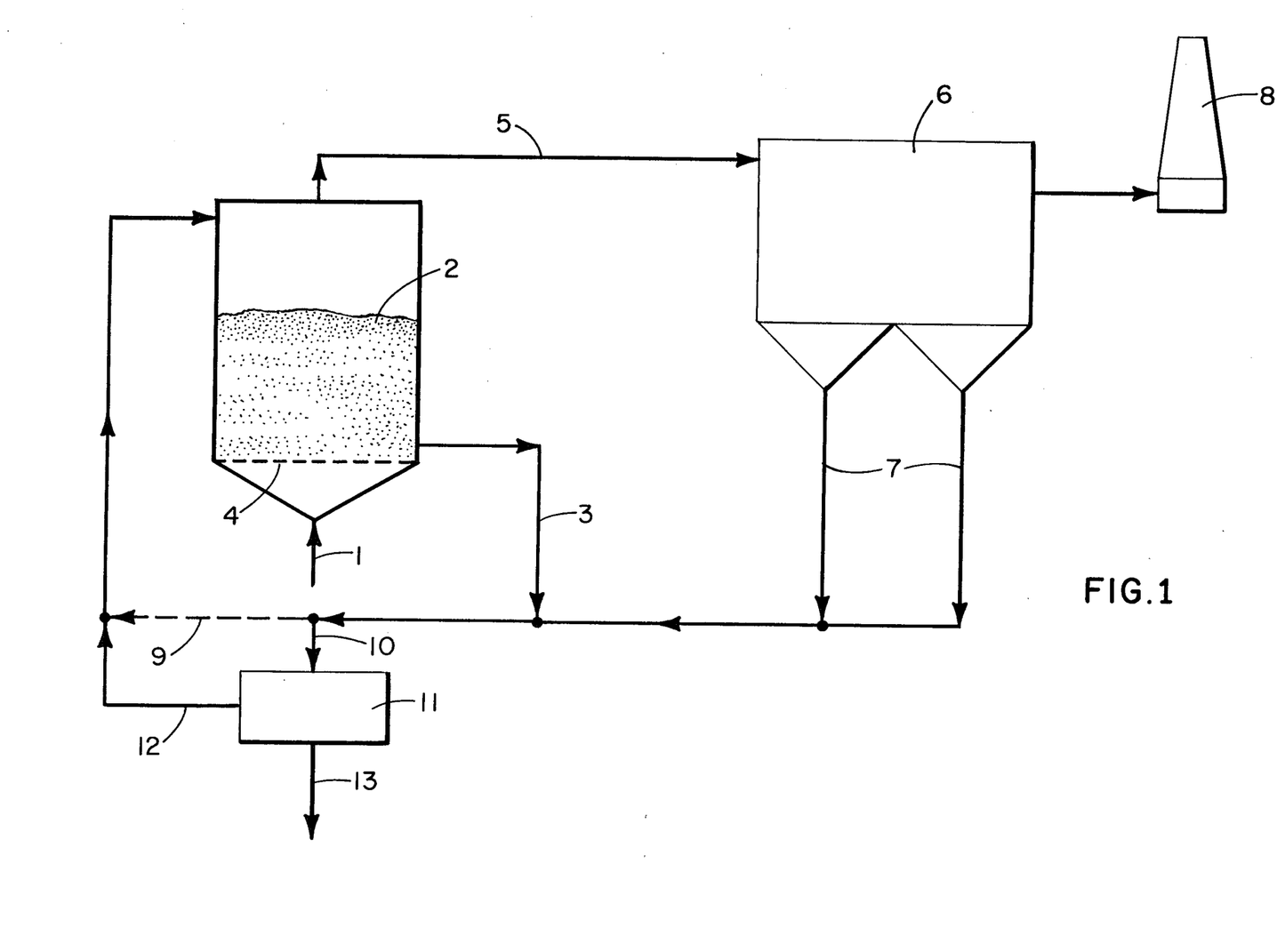
FIG. 1 is a general schematic flow diagram showing the process of this invention.

In the first step of the process of the present invention substantially dry activated $MnO_2$ particles are fluidized in a reaction zone, e.g., a fluid bed 2. The phrase "substantially dry" means that the activated $MnO_2$ particles have a moisture content of less than 10 percent by weight. The particles are fluidized by an industrial gas containing Total Reduced Sulfur compounds introduced into fluid bed 2 through conduit 1. The industrial gas typically can have contaminant levels of TRS compounds of at least 10 ppm and preferably at least about 500 and can range up to 1,000 ppm or more, depending on the source. In addition to the gaseous contaminants, many industrial gas streams may also contain particulate materials such as alkaline dust or other fly ash type particulates. The presence of such materials does not prevent the oxidation and removal of TRS compounds but as described later, certain alternative processing steps may be required for proper regeneration of an active $MnO_2$. The adsorbent particles are supported above gas introduction point by any suitable means, e.g., a screen or perforated plate 4.

The gas flow rate through the reaction zone can vary depending on the nature of the apparatus employed and the conditions of operation. The gase flow rates must be sufficient to fluidized the absorbent and is preferably high enough to entrain spent adsorbent partices, i.e., manganese dioxide absorbent particles containing areas of reduced manganous compounds, for collection downsteam thereof, e.g., in a bag house filter.

In the fluid bed reaction zone, the industrial gas stream and the activated manganese dioxide absorbent particles are contacted so that at least a part of the TRS compounds are simultaneously removed from the gas by $MnO_2$ oxidation and absorption on the $MnO_2$ particles. The product formed is a dry powder which comprises the $MnO_2$ absorbent particles containing areas of reduced manganous compounds, i.e., the TRS oxidation products. The exact nature of all reactions taking place in the fluid bed reaction zone is not completely known and will, of course, vary with the nature of the industrial gas. In general, however, sulfur containing compounds are converted (oxidized) to sulfates or sulfonates while the $MnO_2$ is reduced to a lower valence state, i.e., $Mn^{++}$.

In addition to active $MnO_2$, the absorbent particles may also include alkaline material such as sodium carbonate, sodium hydrogen carbonate, sodium hydroxide, or the like, including mixtures thereof. It has been found that the oxidation/absorption step proceeds more efficiently when an alkaline material is present in the particles. In general, the alkaline material can be added in an amount of from about 1% to 10% by weight based on the total weight of the absorbent. Preferred are alkaline additions of from abut 1% to 3%. As described below, certain industrial gases may have significant quantities of alkaline particulates entrained therein.

The next step of the process is the recovery of spend absorbent particles, i.e., the $MnO_2$ absorbent particles containing areas of reduced manganous compounds produced in the fluid or moving bed reaction zone. In the broad practice of this invention, this can be accomplished in several ways. For example, in the embodiment shown in FIG. 1, a portion of the particles is removed directly from the bottom of the fluid bed reaction zone. The remaining portion of the particles is carried out of the fluid bed as entrained particles in the scrubbed gas stream 5. This stream is fed to a collector unit 6 described below. In the collector unit, the remainder of the particles is separated from the gas stream, the former being recovered from the collector unit (line 7) and the latter being forwarded to stack 8 for discharge to the atmosphere. In the preferred manner of operation, all the particles are entrained in the gas and are recovered from the collector unit.

While collector unit 6 may broadly comprise a cyclone, an electrostatic precipitator or a bag filter unit or baghouse, a bag filter or baghouse is preferred. In the bag filter unit the absorbent particles form a layer on the upstream surface of a gas permeable filter fabric through which layer all the gas that enters the unit is constrained to pass. As will be more particularly illustrated in the examples hereafter, this arrangement provides an extremely efficient contact between the gas and the manganese dioxide absorbent particles due to lower void volume in the filter fabric than in the fluid bed. As a result, surprisingly substantial further absorption of TRS compounds takes place in the bag filter unit.

As noted above, it is preferred to remove all of the spent absorbent from the reaction zone 2 via entrainment in the fluidizing gas. This can be accomplished by using a flash duct or fast fluid bed for reaction 2. In these arrangements, the gas velocity is high enough to entrain all of the absorbent particles in the gas to the collection device 6.

The spent absorbent material collected in the bag filter collector unit 6 and removed therefrom through outlet 7, possibly together with absorbent material recovered through outlet 3, may be divided into two portions; the first of which is recycled through conduit 9 for directly re-introducing it into fluid bed reaction zone 2. The remaining portion of the absorbent material is passed through conduit 10 to an oxidative regeneration section 11, which, within the scope of the present invention, may comprises various operations. Alternatively, the total amount of absorbent material recovered through outlets 3 and 7 may be passed to the regeneration section.

Regeneration generally is effected by liquid phase oxidation of $Mn^{++}$ compounds resulting from the reactions taking place in the fluid bed reaction zone. The products of regeneration include an insoluble reactivated $MnO_2$-containing stream 12 and stream 13 containing soluble sulfur-containing compounds which can be removed (bled) from the system by separating all or a part of the aqueous regeneration products.

Among the suitable liquid phase oxidation techniques are electrolytic oxidation (i.e., oxidation by nascent oxygen) and treatment with various oxidizing agents such as oxygen-containing gases (e.g., air), ozone, peroxides, persulfates, permanganates, hypochlorites, perchlorates, hypochlorates, and the like. Preferably, these techniques are carried out at ambient temperatures although somewhat higher or lower temperatures may be employed as long as the liquid system is not adversely affected, e.g., by boiling or freezing.

In general, there are two basic procedures for effecting this liquid phase oxidative regeneration. As indicated above, the spent absorbent material contains areas of reduced Mn values, possibly as $Mn^{++}$ salts. The first and most preferred approach is to suspend this material in water and subject the entire suspension to oxidation. While not wishing to be bound to any particular theory, applicants believe that oxidation of $Mn^{++}$ values may take place at or on the surface of the spent absorbent particles and/or in the aqueous phase due to solubilization (extraction) of these values. In any event, the regeneration of $MnO_2$ from $Mn^{++}$ values is best accomplished by oxidizing the complete aqueous suspension (possibly containing both absorbed and extracted $Mn^{++}$ values). In an alternative embodiment, it is possible to rely solely on extraction to provide $Mn^{++}$ values for regeneration, in which case, the aqueous suspension can be separated (e.g., by filtration decantation, etc.) into a solid unreacted $MnO_2$ fraction and an aqueous fraction and only the aqueous fraction subject to oxidation of the type described above. Generally, the particle size of the regenerated material produced using this alternate option is too small for optimum operation of the fluid bed reaction zone. In either case, the solubilized sulfur containing salts can be removed from the system by bleeding out all or a portion of the aqueous phase.

An important advantage of the process of the present invention is the ability to bleed off the soluble oxidation products (i.e., sulfates, sulfonates, sulfinates and the like) and the resulting elimination of the counterproductive need to regenerate the oxide by high temperature heating. In the context of paper mill gas effluent treatment, some part of the bleed-off solution from the regeneration of manganese dioxide can be sent to the recovery boiler where it will be converted into sodium sulfate suitable for reuse in the pulping process. Generally, sodium ions will also be present in the aqueous phase (bleed-off) removed from the system. This bleeding or partial dewatering can be effected by a number of techniques which include, inter alia, sedimentation, wet cycloning, centrifuging, filter pressing and the like.

Both of the above-described approaches will now be described in connection with the preferred type of oxidative regeneration—that employing an oxygen-containing gas (e.g., air) as the oxidizing agent.

Figure 2:
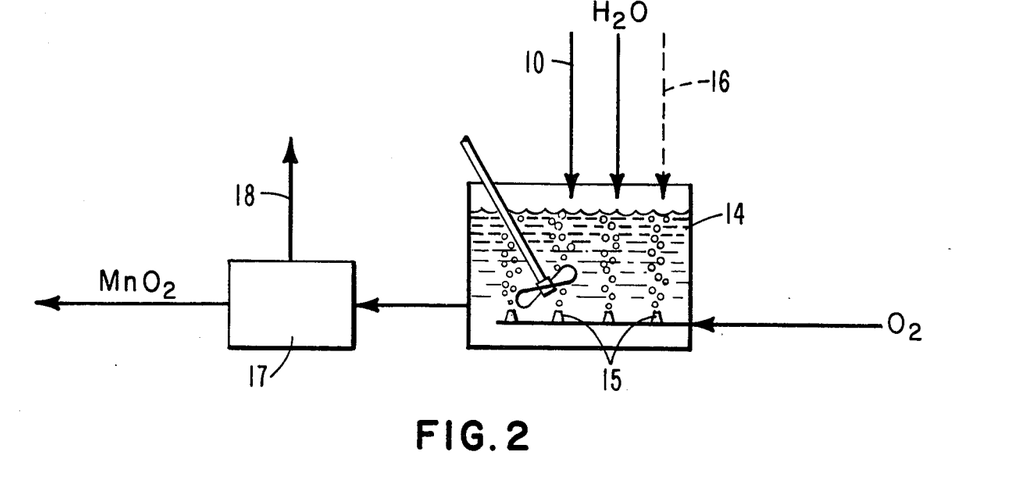
FIG. 2 is a schematic flow diagram illustrating the preferred embodiment for regeneration of the spent absorbent to be used in the process depicted in FIG. 1.

The preferred embodiment of this procedure is illustrated in FIG. 2. An oxidizing vessel 14 is provided with means for aerating the contents thereof with an oxygen-containing gas. Air will generally be used because of economic considerations. Although nozzles 15 are illustrated as the means for introducing the gas into vessel 14, other means including aerators of the surface or submerged variety may also be used. Such aerating means are well known to one skilled in the art.

The next step involves adding the spent absorbent material 10 to this aerated aqueous medium (i.e., suspending the powder). An important feature of this preferred regeneration procedure is the establishment of a well-aerated aqueous medium in vessel 14 before the absorbent material to be regenerated is introduced thereto.

Another parameter which appears important in this preferred regeneration scheme is the pH of the aerated aqueous medium. The oxidative regeneration is based primarily on the following overall reacton:

$$2Mn^{++} + O_2 + 4OH^- \rightarrow 2MnO_2 + 2H_2O$$

While not wishing to be bound to any particular therory, it is believed that this overall rection actually proceeds via the precipitation of an intermediate $Mn(OH)_2$ which in turn is oxidized to $MnO_2$. This reaction via $Mn(OH)_2$ proceeds most efficiently under alkaline pH conditions. While the exact pH necessary to effect production of an activated $MnO_2$ absorbent (e.g., by $Mn(OH)_2$ precipitation) can vary widely dependent on the nature of the absorbent and its concentration in the slurry, in general, the slurry pH should be adjusted (unless already alkaline) to a value of at least 7 or above and preferably in the range of from about 9 to 12.5. The proper pH for any particular regeneration system can be determined experimentally. If the pH is too low or too high, an active $MnO_2$ is not produced.

Since the above reaction indicates a consumption of hydroxide ions, it may be necessary to provide for a continuous addition of alkali to the vessel 10 as indicated by the dotted line 16. However, since a sufficient amount of alkali will often be present in the material to be regenerated through line 10, the addition of further alkaline material may not be necessary.

The proposed $Mn(OH)_2$ intermediate reaction route is also primarily responsible for the requirement of starting the flow of oxygen-containing gas at the very beginning of the regeneration process. It has been found that sufficient oxygen must be present at the very moment of formation of insoluble $Mn(OH)_2$ precipitate so it can be immediately oxidized to $MnO_2$. If $Mn(OH)_2$ is allowed to age before oxidation takes place, crystallization of the hydroxide will occur making oxidation to an active form of $MnO_2$ difficult or impossible.

As noted before, a particularly advantageous feature of the present invention is that the oxidative regeneration can be performed at ambient temperatures and at average residence times on the order of a few hours. The regeneration may be performed in a batchwise fashion or as a continuous process.

When substantially all of the manganous compounds have been converted into an activated manganese dioxide, the resulting suspension may be passed to a separator 17, for example, a sedimentation vessel, a centrifuge, or a filter. In the separator, most or all of the aqueous solution is removed through conduit 18. A primary purpose of this separator is to bleed off soluble sulfur containing compounds.

The manganese dioxide recovered from the separator 17 is then generally recycled to the fluid bed reaction zone 2. The activated absorbent can normally be introduced into the reaction zone as an aqueous suspension, having about 10 to about 50% solids by weight, and is dehydrated therein to produce substantially dry, activated $MnO_2$ absorbent particles. The absorbent suspension is introduced into the fluid bed reaction zone through an appropriate device, e.g., a rotary disc, to facilitate the fluidization of the moist material. Consequently, the fluid bed reaction zone typically consists of a heterogeneous mass of particles; some particles having little or no aqueous material, and others having a small amount of an aqueous phase. The manganese dioxide produced in the regeneration step by oxidation of manganese ions possesses an activity for the absorption of TRS compounds on the same level as the most efficient manganese dioxide materials commercially available.

Figure 3:
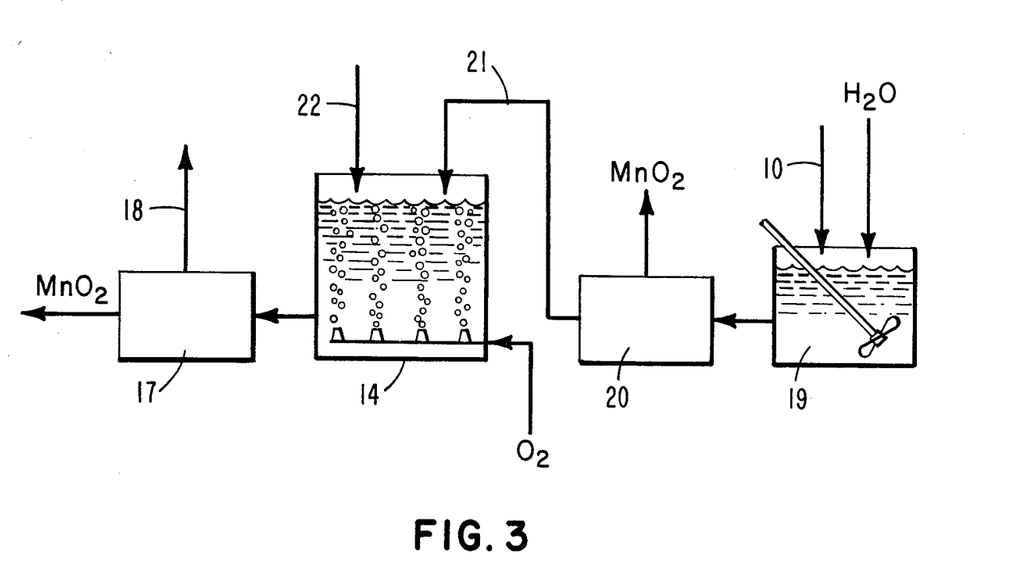
FIG. 3 is a schematic flow diagram depicting an alternative embodiment of the regeneration procedure.
Figure 4:
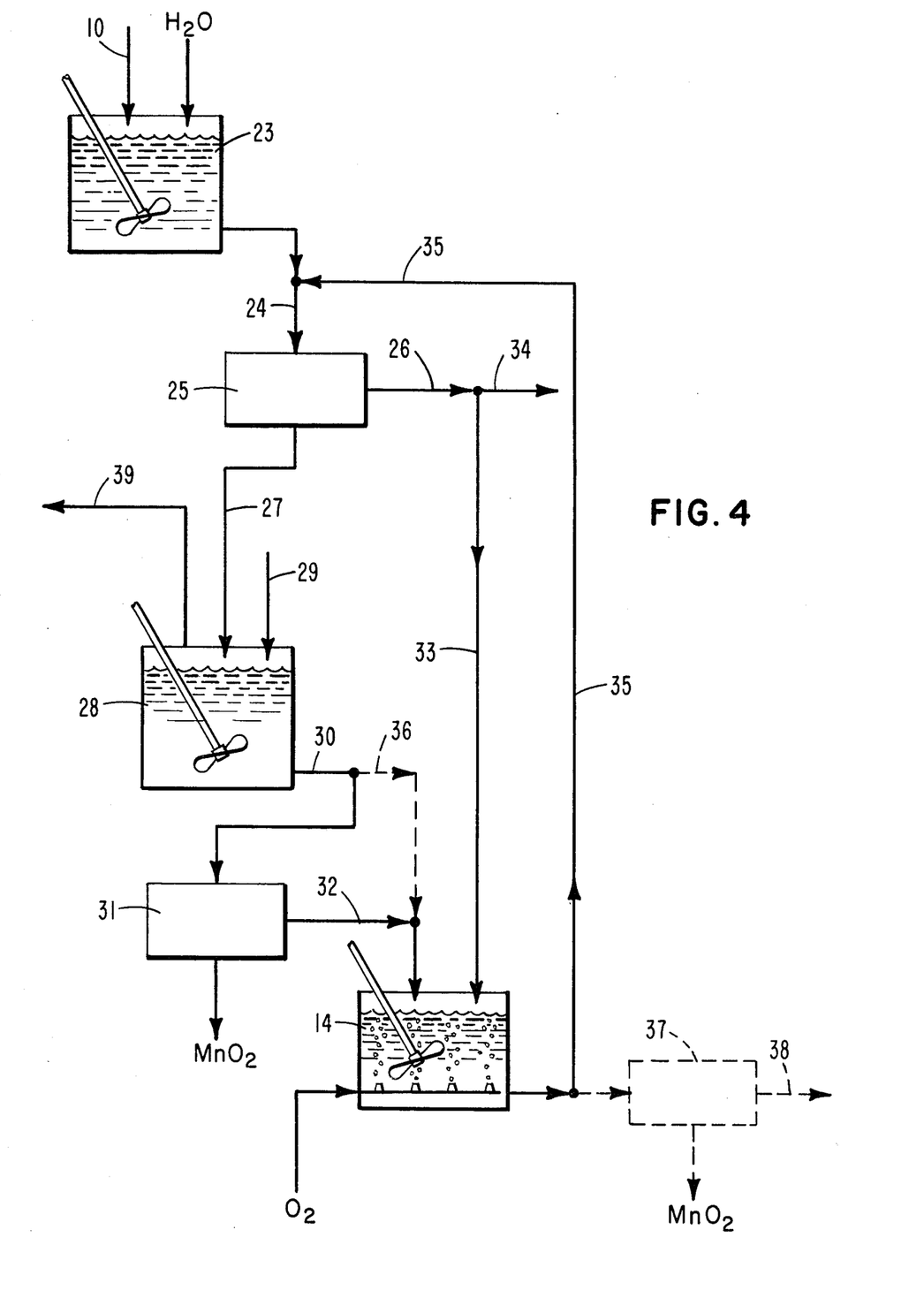
FIG. 4 is a schematic flow diagram showing a further embodiment of the regeneration procedure suitable when the gas to be treated contains substantial amounts of particulate alkaline material.

An alternative approach to regeneration is illustrated in FIGS. 3 and 4. This approach is based generally on the regeneration of an aqueous extract of the dry powder produced in the spray dryer. The differences between the embodiments of FIGS. 3 and 4 are to accommodate different types of feed materials. When the spent absorbent material resulting from the fluid bed reaction zone has only a low content of highly basic components, the scheme of FIG. 3 can be used. However, when the gas to be treated has substantial amounts of entrained alkaline dust or the aqueous feed suspension contains highly basic additives, e.g., NaOH, the embodiment of FIG. 4 should be used.

Referring to FIG. 3, the material to be regenerated 10 is mixed with water in tank 19, i.e., the dry absorbent articles are suspended to form an aqueous regeneration suspension. The suspension is forwarded to a separator 20, e.g., a centrifuge setting vessel or cyclone, in which the solids ($MnO_2$) are recovered for direct recycling to fluid bed reaction zone 2 (FIG. 1). The aqueous extract solution 21 is then added to an aerated aqueous medium in vessel 14 as described above. Thereafter, a basic solution, such as an aqueous sodium carbonate solution, is added to the aeration vessel through line 22. This results in simultaneous precipitation and oxidation of the manganous ions to give an active $MnO_2$ product. The remainder of the regeneration process proceeds as described in connection with FIG. 2.

If the TRS compound-containing gas also contains considerable amounts of alkaline materials, as might be the case when the gas is a waste gas originating from the regeneration furnaces of a pulping mill, the embodiment of FIG. 4 can be used for regeneration of the spent absorbent. The waste gases from pulping mills generally contain sodium carbonate and sodium sulfate as fine particles, which are not easily removed before the gas is subjected to the cleaning procedures according to this invention. This means that a substantial amount of sodium carbonate and other alkaline materials will be present in the spent absorbent material delivered through conduit 10. If such a material is subject to the regeneration treatment described in connection with FIG. 2, it appears that the formation of such manganous compounds as manganous hydroxide and manganous carbonate takes place before the oxidation required to yield active manganese dioxide can occur. Indeed, even prolonged contact with the oxygen-containing gas will not transform these compounds into a product having sufficient activity in the absorption process. Therefore, regeneration of spent absorbent having a high alkali content preferably takes place as illustrated in FIG. 4.

In FIG. 4 is shown a mixing tank 23 into which the absorbent material to be regenerated is introduced through line 10 and is mixed with water to form an aqueous regeneration suspension therein. The suspension 24 is conducted to a separator 25 and separated into an aqueous phase 26 and a thickened slurry of the absorbent material 27. At this point the slurry may have a pH exceeding 10.

The thickened slurry of absorbent material 27 is fed to a treatment tank 28 in which it is treated with a diluted acid, preferably sulfuric acid, introduced through conduit 29 to effect dissolution (extraction) of manganous values not extracted in the aqueous resuspension step. Adjusting the slurry to a pH of generally less than about 4 has been found to be suitable to accomplish this result. Since minor amounts of hydrogen sulfide may be generated by this procedure, venting means 39 are provided for venting any gases released in tank 28 to a location upstream of the fluid bed reactor 2.

The acidified slurry 30 containing undissolved $MnO_2$ is forwarded to separator 31 where $MnO_2$ is recovered. The aqueous $Mn^{++}$ acid extract 32 is thereafter supplied to oxidation vessel 14 operation as described in connection with FIG. 2. The alkaline extract medium from separator 25 is added to oxidizing tank 14 via conduit 33, after partial purge of this line, if desired, shown at 34.

The activated $MnO_2$ suspension produced in oxidation vessel 14 can be recycled via line 35 to conduit 24 resulting in recovery of $MnO_2$ from separator 31. In this scheme any insoluble manganous compounds not oxidized in vessel 14 will be dissolved in tank 28 and thereby recycled to oxidation tank 14.

In an illustrated alternative embodiment shown in dotted lines on FIG. 4, the acidified slurry from tank 28 is fed directly to vessel 14 via line 36. In this approach the $MnO_2$ solids are fed to the oxidizer along with the alkaline and acidic extract products. Instead of using recycle line 35, the $MnO_2$ solids can be recovered in separator 37.

The recovered aqueous phase 38 may be purged or used as a supplemental alkaline material for addition to oxidation vessel 14. In addition to the alkaline solution introduced through line 33 (or 38), the oxidation tank 14 may also receive basic materials from other sources (not shown) if required for adjusting the alkalinity.

The following examples are intended to illustrate more fully the nature of the present invention without acting as a limitation on its scope.

EXAMPLE 1

An amount of $MnO_2$ was prepared by spraying a solution of $MnSO_4$ (10%) into a container which was aerated by means of nozzles. The pH of the solution in the container was continuously adjusted to 9 by addition of aqueous sodium hydroxide. Aeration was continued for one hour after the addition of the $MnSO_4$ solution was completed. The precipitated $MnO_2$ was washed several times, filtered and dried in an oven at 105° C. A sample of the prepared $MnO_2$ was analyzed by the oxalate method and the composition found to be $MnO_{1.70}$.

A synthetic effluent gas mixture containing on a dry basis 250 ppm (by volume) $H_2S$, 2% by volume $O_2$, the rest being $N_2$ was treated in a laboratory fluid bed with recycling of particles entrained by the gas as illustrated by the dotted line in FIG. 1.

The gas has a temperature of 150° C. and a relative humidity of 0.05 and was fed to the fluidized bed reaction zone previously charged with manganese dioxide prepared as described above.

The fluidizing velocity of the gas was 0.3 m/s corresponding to a residence time for the gas in the fluid bed of 3-4 s.

A substantial 100% absorption of $H_2S$ was observed until the $MnO_2$ in the fluid bed had absorbed 25 g $H_2S$ per kg $MnO_2$. Continuing the test after such an amount of $H_2S$ had been absorbed, the absorption efficiency decreased slowly and reached 60% when about 70 g $H_2S$ per kg $MnO_2$ had been absorbed.

The reacted $MnO_2$ was analyzed for $SO_4^{-2}$ using an ion chromatograph by the following 3 methods: Method 1: The material was extracted with water (stirring for 30 minutes) and the filtrate analyzed for $SO_4^{-2}$; method 2: same as method 1 except that the extraction was done with 0.5 N HCl; method 3: same as method 1 except that the extraction was done with a mixture of 0.5 N HCl and 3% $H_2O_2$. Methods 1 and 2 gave identical results while method 3 showed a small increase in $SO_4^{2-}$ content per gram of sample compared to the other methods, showing that about 98% of sulphur was in the form of sulphate and the rest as free sulphur.

The material from the fluid bed absorption experiment was washed carefully. A sample of this washed material was analyzed by the oxalate method and the composition found to be $MnO_{1.70}$. The rest of the washed material was used for fluid bed absorption and was found to have regained efficiency and capacity for absorbing $H_2S$.

The washing, which contained $MnSO_4$ formed by the absorption, was subjected to an oxidation as described in the first paragraph of this Example. A black powder corresponding to the formula $MnO_{1.7}$ was produced The activity as to absorption of $H_2S$ was as high as the activity of the originally produced material.

EXAMPLE 2

This example was performed as described in Example 1 except that $CH_3SH$ was substituted as an impurity for the $H_2S$. In this case the absorption was 100% until 5 g of $CH_3SH$ per kg $MnO_2$ had reacted. Again ion chromatography showed that the reaction product consisted almost entirely of MnSO$_4$. The reaction material regained its activity by washing, and oxidation as described above in connection with Example 1.

EXAMPLE 3

This example demonstrates the use of an oxidizing agent such as sodium hypochlorite in the ambient temperature, liquid phase oxidative regeneration of spent MnO$_2$ absorbent. The spent MnO$_2$ was resuspended in water and was activated (oxidized) by treatment with 10% (W/W) of a sodium hypochlorite solution containing 12.3% (W/W) active chlorine. The recovered precipitate exhibits the desired activity for TRS compounds.

EXAMPLE 4

This example demonstrates the regeneration of spent MnO$_2$ absorbent employing the embodiment of FIG. 2. The spent MnO$_2$ was resuspended in water at a concentration of 10% solids. After mixing for thirty minutes, stirring was discontinued and the MnO$_2$ was allowed to settle over a three hour period. Thereafter, the clear supernatant solution containing soluble manganous ions was treated with 2% (W/W) sodium hypochlorite solution containing 15% (W/W) active chlorine. The resulting slurry was then mixed for about two hours, during which time a fine precipitate of MnO$_2$ formed. The resulting slurry was washed three times with water; the slurry was allowed to settle after each washing. The recovered precipitate exhibits excellent activity for mercaptan removal.

EXAMPLE 5

This example demonstrates the regeneration of spent MnO$_2$ absorbent employing the embodiment of FIG. 3. Dry powder produced in the spray dryer absorber (see Example 1) and recovered from the bag filter was washed with water to form an aqueous extract solution containing soluble Mn$^{++}$ values. This extract solution was placed in an aerating vessel and the flow of air bubling through was started. The pH of the aerated aqueous medium was then adjusted to a valve above 10-11. After about 16 hours the reaction was stopped, the mixture filtered. The black filter cake (MnO$_2$) was as active as the original material employed.

EXAMPLE 6

This example demonstrates the regeneration of spent MnO$_2$ absorpbent employing the embodiment of FIG. 4. Dry powder (4.9 g) from the spray dryer absorber produced using an MnO$_2$ absorbent containing NaHCO$_3$ was treated with 100 ml. of a 10% (W/W) solution of H$_2$SO$_4$ at 50°-60° C. The suspension was filtered and the aqueous acid extract containing Mn$^{++}$ was diluted to 300 ml. and placed in an aerating vessel. After the flow of air was established, 150 ml. of 1.2M NaOH were slowly added while stirring and a brown precipitate formed. After one hour the reaction was stopped and the mixture was filtered to recover a MnO$_2$ absorbent which proved to be as active as the original one.

While certain specific embodiments of the invention have been described with particularity herein, it will be recognized that various modifications thereof will occur to those skilled in the art. Therefore, the scope of the invention is to be limited solely by the scope of the appended claims.

We claim:

1. A process for the removal of Total Reduced Sulfur compounds from an industrial gas comprising the steps of:
    (a) fluidizing substantially dry, activated manganese dioxide absorbent particles in a reaction zone with an elevated temperature stream of said industrial gas to effect oxidation of said Total Reduced Sulfur compounds and absorption of Total Reduced Sulfur compound oxidation products on said absorbent particles;
    (b) recovering manganese dioxide absorbent particles containing areas of reduced manganous compounds from said reaction zone;
    (c) suspending at least a part of the absorbant particles recovered in step (b) in water to produce an aqueous regeneration suspension;
    (d) subjecting at least the aqueous portion of said regeneration suspension to liquid phase oxidation to produce an activated manganese dioxide absorbent-containing suspension;
    (e) drying the activated manganese dioxide absorbent-containing suspension to produce substantially dry, activated manganese dioxide absorbent particles; and
    (f) recycling the activated manganese dioxide absorbent to the reaction zone.

2. A process for the removal of Total Reduced Sulfur compounds from an industrial gas comprising the steps of:
    (a) fluidizing substantially dry, activated manganese dioxide absorbent particles in a reaction zone with an elevated temperature stream of said industrial gas to effect oxidation of said Total Reduced Sulfur compounds and absorption of Total Reduced Sulfur compound oxidation products on said absorbent particles;
    (b) recovering from said reaction zone a gas stream containing entrained manganese dioxide absorbent particles, said particles containing areas of reduced manganous compounds;
    (c) forwarding said gas stream to a bag filter collector and therein separating said entrained absorbent particles from said gas stream, said particles forming a layer on the filter surface whereby further removal of Total Reduced Sulfur compounds from the gas stream is effected;
    (d) recovering said layer of absorbent particles from said bag filter collector;
    (e) suspending at least a part of the absorbent particles recovered in step (d) in water to produce an aqueous regeneration suspension;
    (f) subjecting at least the aqueous portion of said regeneration suspension to liquid phase oxidation to produce an activated manganese dioxide absorbent-containing suspension;
    (g) drying the activated manganese dioxide absorbent-containing suspension to produce substantially dry, activated manganese dioxide absorbent particles; and
    (h) recycling the activated manganese dioxide absorbent to the reaction zone.

3. A process for the removal of Total Reduced Sulfur compounds from an industrial gas comprising the steps of:
    (a) fluidizing substantially dry, activated manganese dioxide absorbent particles in a reaction zone with an elevated temperature stream of said industrial gas to effect oxidation of said Total Reduced Sulfur compounds and absorption of Total Reduced Sulfur compound oxidation products on said absorbent particles;

(b) recovering manganese dioxide absorbent particles containing areas of reduced manganous compounds from said reaction zone;

(c) providing an aqueous regeneration medium by supplying a flow of oxygen-containing gas through said aqueous medium;

(d) adding to said aqueous regeneration medium at least a part of the manganese dioxide absorbent containing areas of reduced manganese compounds or an aqueous extract thereof;

(e) after the oxygen-containing gas flow of step (c) has begun, maintaining the pH in said regenerating medium at an alkaline level sufficient to produce an activated manganese dioxide absorbent-containing suspension;

(f) continuing the flow of said oxygen-containing gas through the alkaline regenerating medium for a period sufficient to produce an activated manganese dioxide absorbent-containing suspension;

(g) drying the activated manganese dioxide absorbent-containing suspension to produce substantially dry, activated manganese dioxide absorbent particles; and (h) recycling the activated manganese dioxide absorbent to the reaction zone.

4. The process of claims 1, 2 or 3 wherein said Total Reduced Sulfur compounds comprise hydrogen sulfide, mercaptans and mixtures thereof.

5. The process of claim 1, 2 or 3 wherein said activated manganese dioxide absorbent additionally comprises an alkaline component.

6. The process of claim 5 wherein said alkaline component is selected from the group consisting of sodium hydroxide, sodium hydrogen carbonate and sodium carbonate.

7. The process of claims 1, 2 or 3 wherein at least a part of said particles recovered from said reaction zone is recycled directly back to said reaction zone.

8. The process of claim 1, 2 or 3 wherein said industrial gas is admitted to said reaction zone at a temperature of from about 120° to 300° C.

9. The process of claim 1 or 3 wherein a gas stream having at least a portion of said absorbent particles entrained therein is recovered from said reaction zone and forwarded to a collector unit wherein said portion of absorbent particles is separated from said gas stream.

10. The process of claim 2 wherein all of the absorbent particles recovered from said reaction zone are entrained in said gas stream and subsequently recovered in said collector unit.

11. The process of claim 9 wherein all of the absorbent particles recovered from said reaction zone are entrained in said gas stream and subsequently recovered in said collector unit.

12. The process of claim 2 wherein a first portion of said absorbent particles is recovered directly from said reaction zone, and a second portion of said absorbent particles is recovered from said collector unit.

13. The process of claim 9 wherein a first portion of said absorbent particles is recovered directly from said reaction zone, and a second portion of said absorbent particles is recovered from said collector unit.

14. The process of claim 9 wherein said collector unit comprises a bag filter in which said absorbent particles form a layer of absorbent material on the filter surface to affect further removal of Total Reduced Sulfur compounds from the gas stream.

15. The process of claim 1 or 2 wherein said liquid phase oxidation is effected employing an oxidizing agent selected from the group consisting of air, ozone, peroxides, persulfates, permanganates, hypochlorites, and mixtures thereof.

16. The process of claims 1 or 2 wherein said liquid phase oxidation is effected electrolytically.

17. The process of claim 15 wherein said oxidation agent is passed through an aqueous regeneration medium to which the material to be regenerated is subsequently added.

18. The process of the claim 3 wherein said oxygen-containing gas is air.

19. The process of claim 3 wherein at least a part of said absorbent particles recovered from said reaction zone is added directly to said aqueous regeneration medium.

20. The process of claim 3 wherein an aqueous extract of said absorbent particles is added to said aqueous regeneration medium, said aqueous extract being prepared by resuspending at least a portion of said absorbent particles recovered from said reaction zone in water and thereafter separating insoluble unreacted manganese dioxide from this aqueous solution.

21. The process of claim 20 wherein said aqueous extracted preparation includes the step of employing an acid to dissolve water-insoluble manganous compounds.

22. The process of claim 21 wherein said acid comprises sulfuric acid.

23. The process of claims 1, 2 or 3 wherein at least a portion of the liquid regeneration solution containing dissolved oxidation products is separated from said activated manganese dioxide absorbent prior to said drying and recycling the absorbent for fluidization in the reaction zone.

* * * * *